United States Patent
Berman et al.

(10) Patent No.: US 8,325,756 B2
(45) Date of Patent: Dec. 4, 2012

(54) METHOD AND SYSTEM FOR A POWER REDUCTION SCHEME FOR ETHERNET PHYS

(75) Inventors: Mark Berman, Newport Coast, CA (US); Manolito Catalasan, Mission Viego, CA (US); Ovidiu Bajdechi, Delft (NL); Christopher M. Ward, Utrecht (NL); Bruce H. Conway, Aliso Viejo, CA (US); Derek Tam, Irvine, CA (US); Frank Van Der Goes, Den Haag (NL)

(73) Assignee: Broadcom Corporation, Irvine, CA (US)

( * ) Notice: Subject to any disclaimer, the term of this patent is extended or adjusted under 35 U.S.C. 154(b) by 1598 days.

(21) Appl. No.: 11/734,147

(22) Filed: Apr. 11, 2007

(65) Prior Publication Data

US 2008/0253356 A1    Oct. 16, 2008

(51) Int. Cl.
    *H04L 12/66* (2006.01)
(52) U.S. Cl. ......................................................... 370/465
(58) Field of Classification Search .................. 370/352; 375/257, 295, 346
    See application file for complete search history.

(56) References Cited

U.S. PATENT DOCUMENTS

| | | | |
|---|---|---|---|
| 6,185,263 B1* | 2/2001 | Chan | 375/295 |
| 6,389,077 B1* | 5/2002 | Chan | 375/257 |
| 6,442,142 B1* | 8/2002 | Bar-Niv | 370/252 |
| 2003/0191854 A1* | 10/2003 | Hsu et al. | 709/233 |
| 2004/0201416 A1* | 10/2004 | Wyers et al. | 330/2 |

* cited by examiner

*Primary Examiner* — Kevin C Harper
*Assistant Examiner* — Henry Baron
(74) *Attorney, Agent, or Firm* — Farjami & Farjami LLP (57) ABSTRACT

Aspects of a method and system for a power reduction scheme for Ethernet PHYs are provided. An Ethernet PHY in a link partner may disable transmission via a transmit DAC integrated during an inactive connection, 10Base-T autonegotiation operation, and/or active 10Base-T connection with no data packet transmission. The DAC may be a voltage mode or current mode DAC. The PHY or a MAC device may determine when to disable transmission via the DAC. In this regard, the PHY or the MAC device may generate appropriate signals for disabling the transmission. The DAC may be enabled for transmission by the PHY or the MAC device when a connection becomes active or when an active 10Base-T connection is ready to transmit data. Moreover, the PHY may enable transmission via the DAC when operating in a forced 10Base-T mode of operation and the connection to the link partner is active.

26 Claims, 11 Drawing Sheets

METHOD AND SYSTEM FOR A POWER REDUCTION SCHEME FOR ETHERNET PHYS

CROSS-REFERENCE TO RELATED APPLICATIONS/INCORPORATION BY REFERENCE

Not Applicable.

FIELD OF THE INVENTION

Certain embodiments of the invention relate to communication of signals. More specifically, certain embodiments of the invention relate to a method and system for a power reduction scheme for Ethernet PHYs.

BACKGROUND OF THE INVENTION

As the number of devices connected to data networks increase and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10×rate increase more sophisticated signal processing is required to maintain the 100 m standard cable range. However, connections longer than 100 m may require either the use of fiber or the placement of Ethernet switches, hubs, and/or repeaters, at mid-points in the connection to keep all cables less than 100 m in length.

Other efforts include the development of a standard for 10 Gigabits-per-second (Gbps) Ethernet transmission over twisted-pair cabling (10GBase-T). The emerging 10GBase-T PHY specification is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. Moreover, new cabling specifications are being developed to diminish susceptibility to external electro-magnetic interferences.

As the operations of newer and more sophisticated Ethernet PHYs become more complex, one aspect that remains of importance to the user is the need to minimize or reduce the overall power consumption of these devices. In this regard, novel schemes may be necessary that enable controlling the overall power usage of Ethernet PHYs under certain operating conditions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a power reduction scheme for Ethernet PHYs, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a power reduction scheme for Ethernet PHYs. Aspects of the invention may comprise a scheme that may reduce the overall power of an Ethernet PHY under certain operating conditions. Such a scheme may be utilized when implementing transmitters in the Ethernet PHY that utilize a transmit digital-to-analog converter (DAC), such as a transmit voltage mode DAC (VDAC) or a transmit current mode DAC (IDAC). In some instances, transmit VDACs may be utilized in an Ethernet PHY since they may enable reduced power consumption when compared to transmit IDACs. However, VDACs may operate somewhat differently than IDACs regarding their ability to start transmitting signals after being powered down. For example, an IDAC may be able to transmit signals on the analog transmission medium after a very short time from receiving a power-up control indication. A typical time from power-up control indication to the start of accurate analog signal transmission may be approximately less than 40 ns. However, in some VDAC implementations, a typical time from power-up control indication to the start of accurate analog signal transmission may be well over 1 µs, and in some instances perhaps up to 6 µs. In this regard, the time to power-up a VDAC may be considered when implementing power reduction schemes. Notwithstanding, an embodiment of the invention may utilize a power reduction scheme when transmit VDACs or transmit IDACs are utilized.

Aspects of the invention may comprise a power reduction scheme in an Ethernet PHY in a link partner that may disable transmission via a transmit DAC during an inactive connection, 10Base-T autonegotiation operation, and/or active 10Base-T connection with no data packet transmission. The transmit DAC may be a transmit VDAC or a transmit IDAC. The Ethernet PHY or a MAC device in the link partner may determine when to disable transmission via the DAC. In this regard, the Ethernet PHY or the MAC device may generate appropriate signals for disabling the transmission. The DAC may be enabled for transmission by the Ethernet PHY or the MAC device when a connection becomes active or when an active 10Base-T connection is ready to transmit data. Moreover, the Ethernet PHY may enable transmission via the DAC when operating in a forced 10Base-T mode of operation and the connection to the link partner is active.

Figure 1:
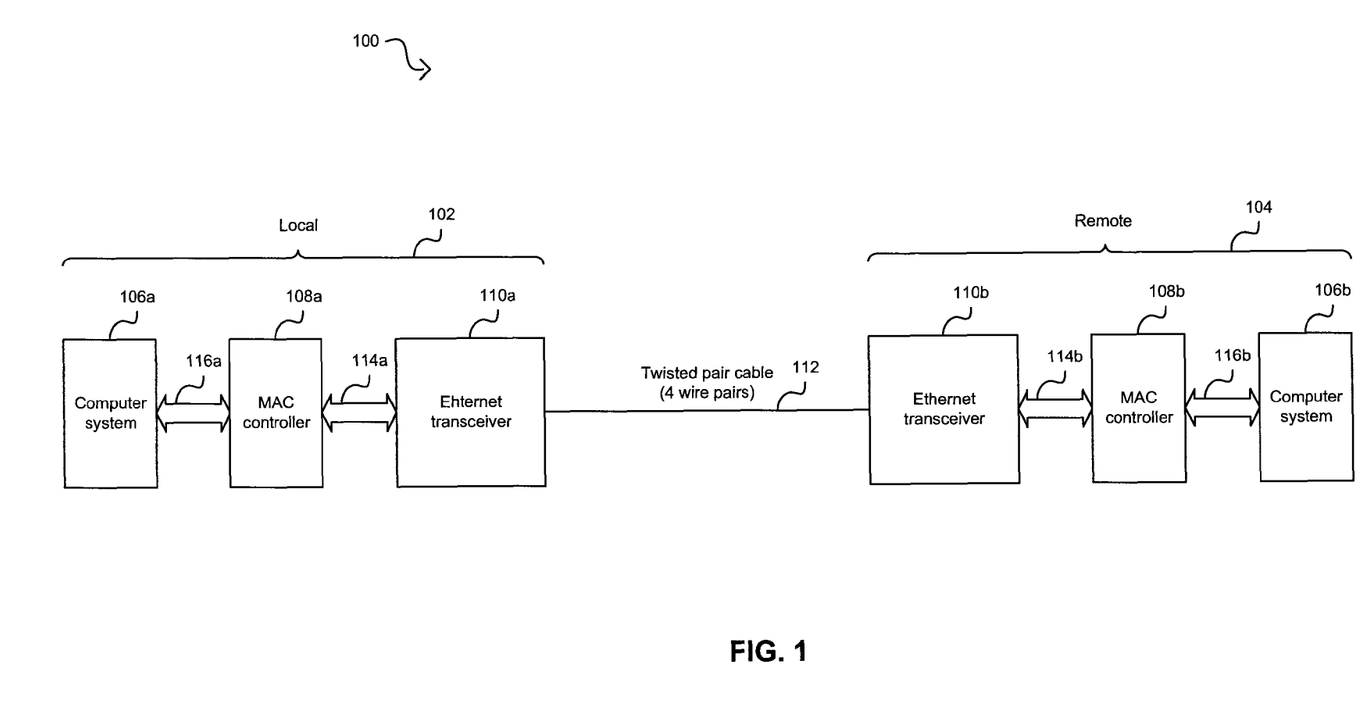
FIG. 1 is a block diagram illustrating an Ethernet over twisted-pair cabling link between a local link partner and a remote link partner, in connection with an embodiment of the invention.

FIG. 1 is a block diagram illustrating an Ethernet over twisted-pair cabling link between a local link partner and a remote link partner, in connection with an embodiment of the invention. Referring to FIG. 1, there is shown a system 100 that comprises a local link partner 102 and a remote link partner 104. The local link partner 102 and the remote link partner 104 communicate via a cable 112. The cable 112 may be a 4-pair unshielded twisted-pair (UTP) copper cabling, for example. Certain performance and/or specifications criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In most instances, a lower category cable may generally have a greater insertion loss than a higher category cable.

The local link partner 102 comprises a computer system 106a, a medium access control (MAC) controller 108a, and a transceiver 104a. The remote link partner 104 comprises a computer system 106b, a MAC controller 108b, and a transceiver 110b. Notwithstanding, the invention is not limited in this regard.

The transceiver 110a comprises suitable logic, circuitry, and/or code that may enable communication, for example, transmission and reception of data, between the local link partner 102 and a link partner, such as the remote link partner 104, for example. Similarly, the transceiver 110b comprises suitable logic, circuitry, and/or code that may enable communication between the remote link partner 104 and a link partner, such as the local link partner 102, for example. The transceivers 110a and 110b may enable multi-rate communications, such as 10 Mbps, 100 Mbps, 1000 Mbps (or 1 Gbps) and/or 10 Gbps, for example. In this regard, the transceivers 110a and 110b may support standard-based data rates and/or non-standard data rates. The transceivers 110a and 110b may utilize multilevel signaling. In this regard, the transceivers 110a and 110b may utilize pulse amplitude modulation (PAM) with various levels to represent the various symbols to be transmitted. For example, for 1000 Mbps Ethernet applications, a PAM5 transmission scheme may be utilized in each twisted-pair wire, where PAM5 refers to PAM with five levels $\{-2, -1, 0, 1, 2\}$.

The data transmitted and/or received by the transceivers 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3.

The transceivers 110a and 110b may utilize power reduction schemes in certain operating conditions. The power saving schemes may be enabled by the transceivers 110a and 110b and/or by their respective MAC controllers 108a and 108b, for example. Each of the transceivers 110a and 110b may utilize more than one power saving scheme in accordance with the operating conditions and/or the hardware utilized by the transceivers 110a and 110b. In some instances, for example, the power reduction schemes may be associated with the transmission of data from one link partner to another link partner.

In the embodiment of the invention illustrated in FIG. 1, the computer systems 106a and 106b may represent layer 3 and above, the MAC controllers 108a and 108b may represent layer 2 and above and the transceivers 110a and 110b may represent the operability and/or functionality of layer 1 or the PHY layer. In this regard, the computer systems 106a and 106b comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the computer systems 106a and 106b to ensure that packets are suitably formatted and communicated to the transceivers 110a and 110b. During transmission, each layer adds its own header to the data passed on from the interfacing layer above it. However, during reception, a compatible device having a similar OSI stack strips off the headers as the message passes from the lower layers up to the higher layers.

The transceivers 110a and 110b may be configured to handle all the physical layer requirements, which include, but are not limited to, packetization, data transfer and serialization/deserialization (SERDES), in instances where such an operation is required. Data packets received by the transceivers 110a and 110b from MAC controllers 108a and 108b, respectively, may include data and header information for each of the above six functional layers. The transceivers 110a and 110b may be configured to encode data packets that are to be transmitted over the cable 112 and/or to decode data packets received from the cable 112.

The MAC controller 108a comprises suitable logic, circuitry, and/or code that may enable handling of data link layer, layer 2, operability and/or functionality in the local link partner 102. Similarly, the MAC controller 108b comprises suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. The MAC controllers 108a and 108b may enable power reduction schemes when certain operating conditions are detected. Notwithstanding, the invention is not limited in this regard.

The MAC controller 108a may communicate with the transceiver 110a via an interface 114a and with the computer system 106a via a bus controller interface 116a. The MAC controller 108b may communicate with the transceiver 110b via an interface 114b and with the computer system 106b via a bus controller interface 116b. The interfaces 114a and 114b may correspond to Ethernet interfaces that comprise protocol and/or link management control signals. The interfaces 114a and 114b may be multi-rate interfaces. The bus controller interfaces 116a and 116b may correspond to PCI or PCI-X interfaces. The interfaces 114a and 114b may be utilized in some instances to communicate information associated with power reduction schemes to be implemented on the transceivers 110a and 100b when certain operating conditions are detected. Notwithstanding, the invention is not limited in this regard.

Figure 2:
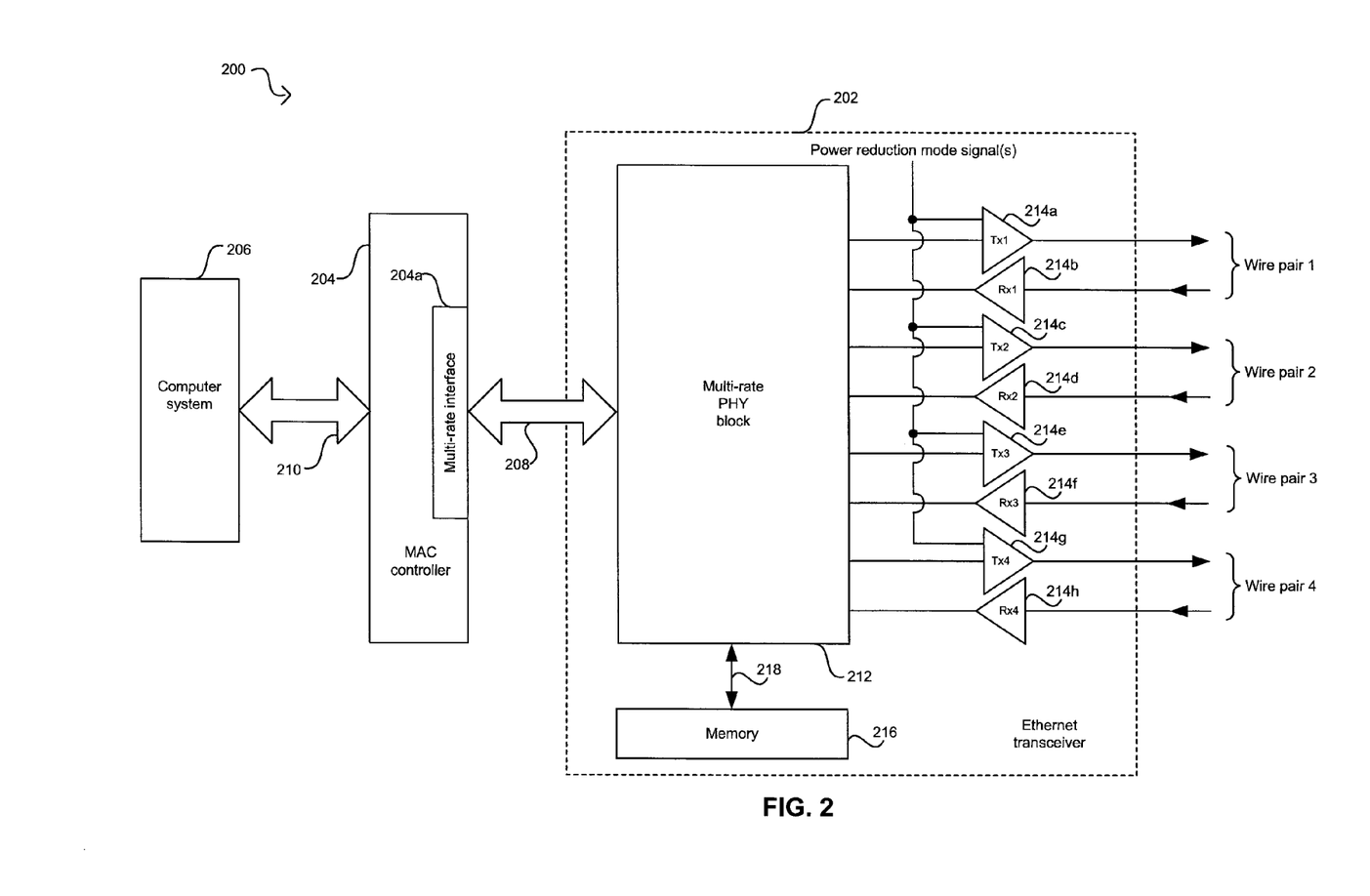
FIG. 2 is a block diagram illustrating an exemplary Ethernet transceiver multi-rate PHY layer architecture that supports power reduction schemes, in accordance with an embodiment of the invention.

FIG. 2 is a block diagram illustrating an exemplary Ethernet transceiver multi-rate PHY layer architecture, in accordance with an embodiment of the invention. Referring to FIG. 2, there is shown a link partner 200 that comprises a transceiver 202, a MAC controller 204, a computer system 206, an interface 208, and a bus controller interface 210. The transceiver 202 may be an integrated device that comprises a multi-rate PHY block 212, a plurality of transmitters 214a, 214c, 214e, and 214g, a plurality of receivers 214b, 214d, 214f, and 214h, a memory 216, and a memory interface 218. The operation of the transceiver 202 may be the same as or substantially similar to the transceivers 110a and 110b as described in FIG. 1. In this regard, the transceiver 202 may provide layer 1 or PHY layer operability and/or functionality. Similarly, the operation of the MAC controller 204, the computer system 206, the interface 208, and the bus controller 210 may be the same as or substantially similar to the respective MAC controllers 108a and 108b, computer systems 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the transceiver 202 at a plurality of data rates via the interface 208.

The multi-rate PHY block 212 in the transceiver 202 comprises suitable logic, circuitry, and/or code that may enable operability and/or functionality of PHY layer requirements. The multi-rate PHY block 212 communicates with the MAC controller 204 via the interface 208. In one aspect of the invention, the interface 208 may be configured to utilize a plurality of serial data lanes for receiving data from the multi-rate PHY block 212 and/or for transmitting data to the multi-rate PHY block 212, in order to achieve higher operational speeds such as Gbps or 10 Gbps, for example. The multi-rate PHY block 212 may be configured to operate in one or more of a plurality of communication modes, where each communication mode implements a different communication protocol. These communication modes may include, but are not limited to, IEEE 802.3, 10GBase-T and other similar protocols. For example, the multi-rate PHY block 212 may support 10Base-T, 100Base-T, 1000Base-T, and/or 10GBase-T operation. The multi-rate PHY block 212 may be configured to operate in a particular mode of operation upon initialization or during operation.

The multi-rate PHY block 212 may also be configured to operate in other operating modes, such as an extended range mode that may support cable lengths that are longer than those supported by standard modes. In some instances, an auto-negotiation scheme may be utilized by the transceiver 202 to indicate or communicate to a remote link partner that the transceiver 202 is operating in a particular mode. The remote link partner may then configure itself to the appropriate mode. In some instances, through standard auto-negotiation, a network link may be configured as an extended range from only one end of the link, ensuring interoperability between extended range enabled Ethernet transceivers and legacy or standard devices. In some instances, the link may be pre-configured and the transceivers fixed in an extended range mode.

The multi-rate PHY block 212 may be coupled to memory 216 through the memory interface 218, which may be implemented as a serial interface or a bus. The memory 216 comprises suitable logic, circuitry, and/or code that may enable storage or programming of information that includes parameters and/or code that may effectuate the operation of the multi-rate PHY block 212. The parameters may comprise configuration data and the code may comprise operational code such as software and/or firmware, but the information need not limited in this regard. Moreover, the parameters may include adaptive filter and/or block coefficients for use by the multi-rate PHY block 212, for example.

The transmitters 214a, 214c, 214e, and 214g may comprise suitable logic, circuitry, and/or code that may enable transmission of data from the link partner 200 to a remote link partner via the cable 212 in FIG. 1, for example. In this regard, the transmitters 214a, 214c, 214e, and 214g may be implemented using digital-to-analog converters (DACs). For example, transmitters 214a, 214c, 214e, and 214g may be implemented using voltage-controlled or voltage mode DACs (VDACs) or current-controlled or current mode DACs (IDACs) to enable reduced power consumption operation. The DACs may be utilized to convert digital signals received from the multi-rate PHY block 212 into analog signals for transmission over a twisted-pair wire, for example. Moreover, power reduction schemes or modes may also be utilized to enable or disable the DACs integrated within the transmitters 214a, 214c, 214e, and 214g during the appropriate operating conditions to further reduce the overall power consumption of the Ethernet transceiver 202. In some instances, at least one signal may be generated by the Ethernet transceiver 202 and/or the MAC controller 204 to enable or disable the operation of DACs integrated into the transmitters 214a, 214c, 214e, and 214g. In this regard, each of the transmitters 214a, 214c, 214e, and 214g may be controlled separately when enabling or disabling DACs for power reduction operations.

The receivers 214b, 214d, 214f, and 214h may comprise suitable logic, circuitry, and/or code that may enable receiving data from a remote link partner by the link partner 200. Each of the four pairs of transmitters and receivers in the transceiver 202 correspond to one of the four wires in the cable 212. For example, transceiver 214a and receiver 214b are utilized to communicate with a remote link partner via the first wire pair in the cable 212. Similarly, transceiver 214g and receiver 214h may be utilized to communicate with a remote link partner via the fourth wire pair in the cable 212. In this regard, at least one of the four transceiver/receiver pairs may be enabled to provide the appropriate communication rate.

Figure 3:
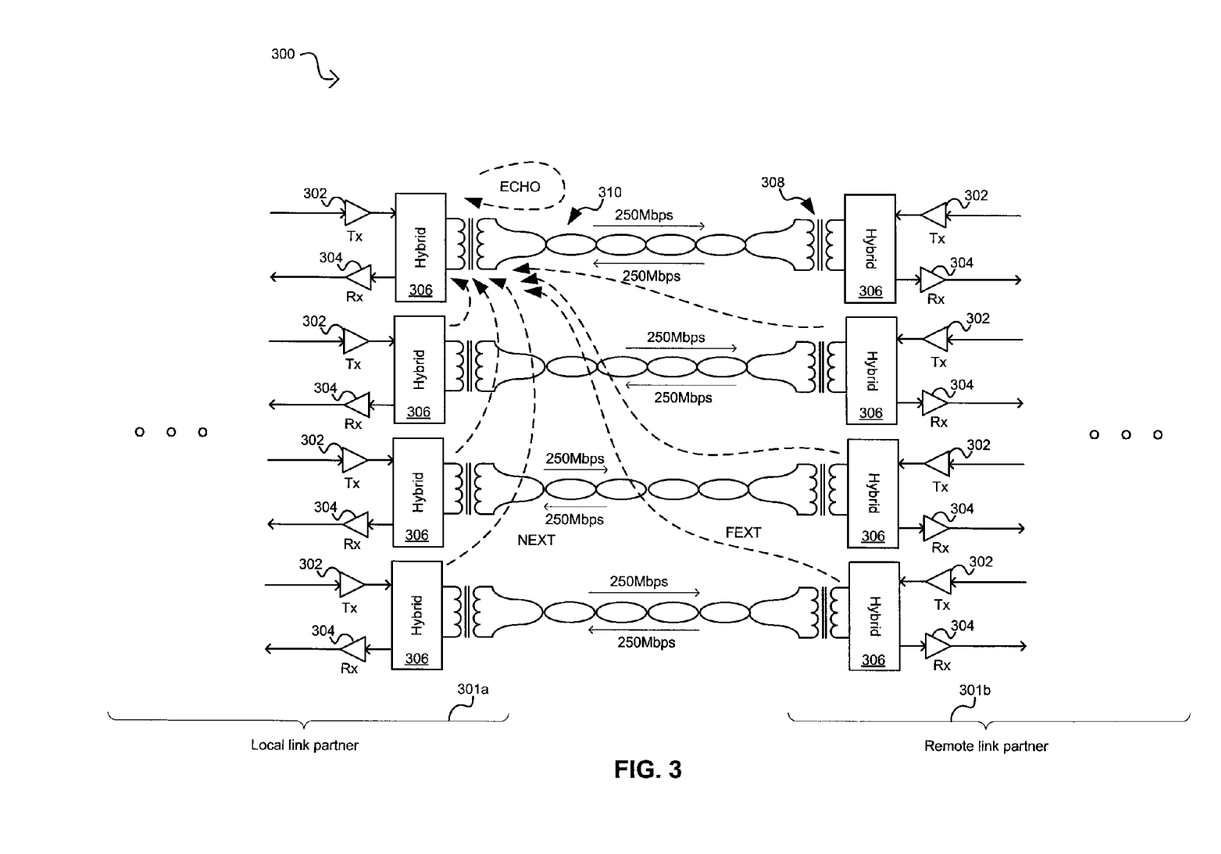
FIG. 3 is a block diagram illustrating ECHO, NEXT, and FEXT channel conditions in a Gigabit Ethernet system, in connection with an embodiment of the invention.

FIG. 3 is a block diagram illustrating ECHO, NEXT, and FEXT channel conditions in a Gigabit Ethernet (1GBase-T) system, in connection with an embodiment of the invention. Referring to FIG. 3, there is shown a Gigabit Ethernet system 300 that may comprise a local link partner 301a and a remote link partner 301b. The local link partner 301a and the remote link partner 301b may communicate via four twisted-pair wires 310 in full duplex operation. Each of the four twisted-pair wires 310 may support 250 Mbps data rates to provide an aggregate data rate of 1 Gbps. The local link partner 301a may comprise four hybrids 306. Each hybrid 306 in the local link partner 301a may be communicatively coupled to a transmitter 302, a receiver 304, and to one of the four twisted-pair wires 310. Similarly, the remote link partner 301b may comprise four hybrids 306. Each hybrid 306 in the remote link partner 301b may be communicatively coupled to a transmitter 302, a receiver 304, and to one of the four twisted-pair wires 310. The portions of the local link partner 301a and the remote link partner 301b shown in FIG. 3 may correspond to a portion of the physical (PHY) layer operations supported by the local link partner 301a and remote link partner 301b respectively.

Each hybrid 306 in the local link partner 301a or the remote link partner 301b may be communicatively coupled to or comprise a transformer 308. The hybrid 306 may comprise suitable logic, circuitry, and/or code that may enable separating the transmitted and received signals from a twisted-pair wire 310. The transmitters 302 may comprise suitable logic, circuitry, and/or code that may enable generating signals to be transmitted to a link partner at the other end of the link via a hybrid 306 and a twisted-pair wire 310. The transmitters 302 may utilize VDACs or IDACs for converting digital signals to analog signals for transmission. In this regard, the VDACs or IDACs in the transmitters 302 may be enabled or disabled in accordance with power reduction modes or schemes that may be implemented based on the operating conditions. The receivers 304 may comprise suitable logic, circuitry, and/or code that may enable processing signals received from a link partner at the other end of the link via a twisted-pair wire 310 and a hybrid 306.

During operation, several conditions may occur in each of the twisted-pair wires 310. For example, intersymbol interference (ISI) may occur as a result of frequency dependent wire attenuation. As shown in FIG. 3, an ECHO component may be received in a twisted-pair wire 310 from an echo that results from the local transmitter 302 on the same twisted-pair wire 310. A near-end crosstalk (NEXT) component may also be received in a twisted-pair wire 310 from the local transmitters 302 corresponding to the three adjacent twisted-pair wires 310 in the same link partner. Moreover, a far-end crosstalk (FEXT) component may also be received in a twisted-pair wire 310 from the remote transmitters 302 in the link partner at the other end of the link.

Since a Gigabit Ethernet system, such as the Gigabit Ethernet system 300, for example, may require fast operation and a significant amount of signal processing to address at least the channel conditions illustrated in FIG. 3, power reduction modes that enable and disable DACs integrated into the transmitters 302 may not provide sufficiently fast power-on time to be effective with current DAC technology. However, as advances in design and fabrication processes enable faster DAC power-on operations, power reduction schemes that are based on the use of DACs in transmitters may be implemented in Ethernet systems operating at high communication rates, such as 100 Mbps or higher, for example.

Figure 4:
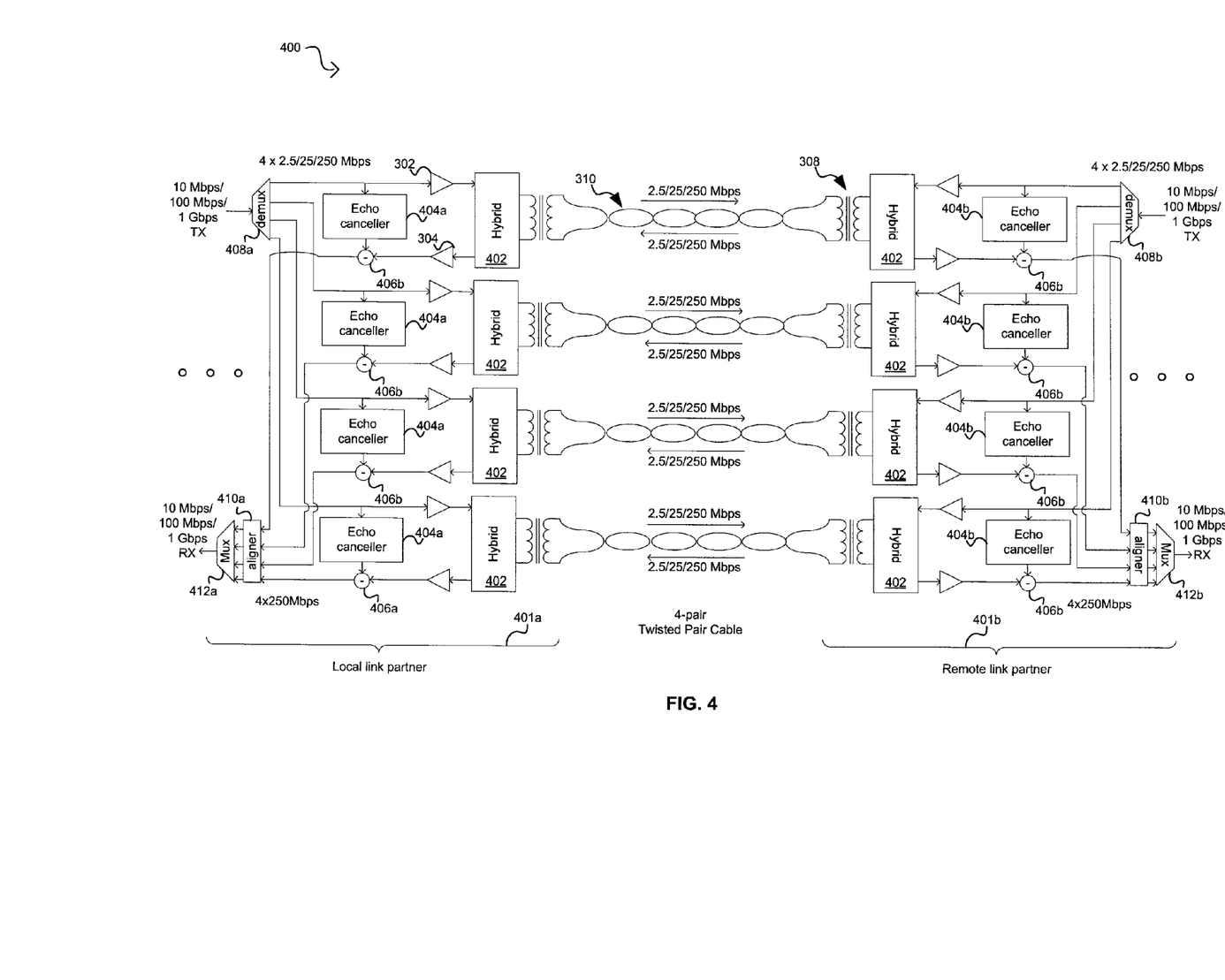
FIG. 4 is a block diagram of an exemplary 10/100/1000Base-T Ethernet connection operating over four-pair twisted-pair cabling, in connection with an embodiment of the invention.

FIG. 4 is a block diagram of an exemplary 10/100/1000Base-T Ethernet connection operating over four-pair twisted-pair cabling, in connection with an embodiment of the invention. Referring to FIG. 4, there is shown a multi-rate Ethernet system 400 that may support full duplex operations at 10 Mbps, 100 Mbps, and/or 1000 Mbps, or Gbps. The multi-rate Ethernet system 400 may comprise a local link partner 401a and a remote link partner 401b. The local link partner 401a and the remote link partner 401b may communicate via four twisted-pair wires 310 in full duplex operation.

Each of the four twisted-pair wires 310 may support 2.5/25/250 Mbps data rates to provide an aggregate data rate of 10/100/1000 Mbps. In this regard, the local link partner 401a and the remote link partner 401b may support 10Base-T, 100Base-T, and/or 1000Base-T operations.

In an exemplary embodiment of the invention, the local link partner 401a may comprise four hybrids 402. The operation of the hybrid 402 may be the same or substantially similar in operation to the hybrid 306 in FIG. 3. Notwithstanding, the invention is not so limited and may support various implementations of a hybrid circuitry. Each hybrid 402 in the local link partner 401a may be communicatively coupled to a transmitter 302, a receiver 304, and to one of the four twisted-pair wires 310. The transmitters 302 may be implemented utilizing DACs for conversion of digital signals to analog signals for transmission over a twisted-pair wire. In this regard, the DACs in the transmitters 302 may be disabled or enabled in accordance with power reduction modes or schemes when certain operating conditions are detected. For example, the power reduction modes or schemes may be supported by at least one of the supported rates, such as 10Base-T, 100Base-T, and/or 1000Base-T operations.

Associated with each hybrid 402 in the local link partner 401a are also an echo canceller 404a and a subtractor 406a. In this regard, the operations of the echo canceller 404a and the subtractor 406a may depend on whether the local link partner 401a is operating in 10Base-T, 100Base-T, or 1000Base-T. For example, at different communication rates or speeds different signal processing algorithms may be utilized to perform ECHO component cancellation. The local link partner 401a may also comprise a demultiplexer (demux) 408a, an aligner 410a, and a multiplexer (mux) 412a.

Similarly, the remote link partner 401b may comprise four hybrids 402. Each hybrid 402 in the remote link partner 401b may be communicatively coupled to a transmitter 302, a receiver 304, and to one of the four twisted-pair wires 310. Associated with each hybrid 402 in the remote link partner 401b are also an echo canceller 404b and a subtractor 406b. The remote link partner 401b may also comprise a demux 408b, an aligner 410b, and a mux 412b. The portions of the local link partner 401a and remote link partner 401b shown in FIG. 4 may correspond to a portion of the physical (PHY) layer operations supported by the local link partner 401a and remote link partner 401b respectively.

The demuxes 408a and 408b may comprise suitable logic, circuitry, and/or code that may enable separating a 10 Mbps, 100 Mbps, or 1 Gbps signal respectively into four 2.5 Mbps, 25 Mbps, or 250 Mbps signals for transmission over the four twisted-pair wires. The aligners 410a and 410b may comprise suitable logic, circuitry, and/or code that may enable aligning the 2.5 Mbps, 25 Mbps, or 250 Mbps signals received from each of the four twisted-pair wires. The muxes 412a and 412b may comprise suitable logic, circuitry, and/or code that may enable combining the aligned 2.5 Mbps, 25 Mbps, or 250 Mbps signals from the aligners 410a and 410b to generate a 10 Mbps, 100 Mbps, or 1 Gbps received signal.

The echo cancellers 404a and 404b may comprise suitable logic, circuitry, and/or code that may enable processing the signal to be transmitted via a transmitter 302 to cancel or otherwise mitigate the ECHO component in the corresponding signal received via the receiver 304 associated with the same twisted-pair wire. The subtractors 406a and 406b may comprise suitable logic, circuitry, and/or code that may enable canceling or mitigating the ECHO component from the received signal.

In an exemplary embodiment of the invention, in operation, the local link partner 401b may separate a 10 Mbps, 100

Mbps, or 1000 Mbps signal to be transmitted into four 2.5 Mbps, 25 Mbps, or 250 Mbps signals via the demux 408a. Each signal to be transmitted may be processed by the transmitter 302 before being communicated to the corresponding twisted-pair wire via a hybrid 402. The four transmitted signals may arrive at the remote link partner 401b where each may be processed by a receiver 404 before an appropriate ECHO component cancellation operation occurs from the operation of a corresponding echo canceller 404b and subtractor 406b. The four received 2.5 Mbps, 25 Mbps, or 250 Mbps signals may be aligned in the aligner 410b before being combined in the mux 412b into a 10 Mbps, 100 Mbps, or 1000 Mbps received signal.

Similarly, in another exemplary embodiment of the invention, in operation, the remote link partner 401b may separate a 10 Mbps, 100 Mbps, or 1000 Mbps signal to be transmitted into four 2.5 Mbps, 25 Mbps, or 250 Mbps signals via the demux 408b. Each signal to be transmitted may be processed by a transmitter 302 before being communicated to the corresponding twisted-pair wire via a hybrid 402. The four transmitted signals may arrive at the local link partner 401a where each may be processed by a receiver 304 before an appropriate ECHO component cancellation operation occurs from the operation of a corresponding echo canceller 404a and subtractor 406a. The four received 2.5 Mbps, 25 Mbps, or 250 Mbps signals may be aligned in the aligner 410a before being combined in the mux 412a into a 10 Mbps, 100 Mbps, or 1000 Mbps received signal.

Figure 5:
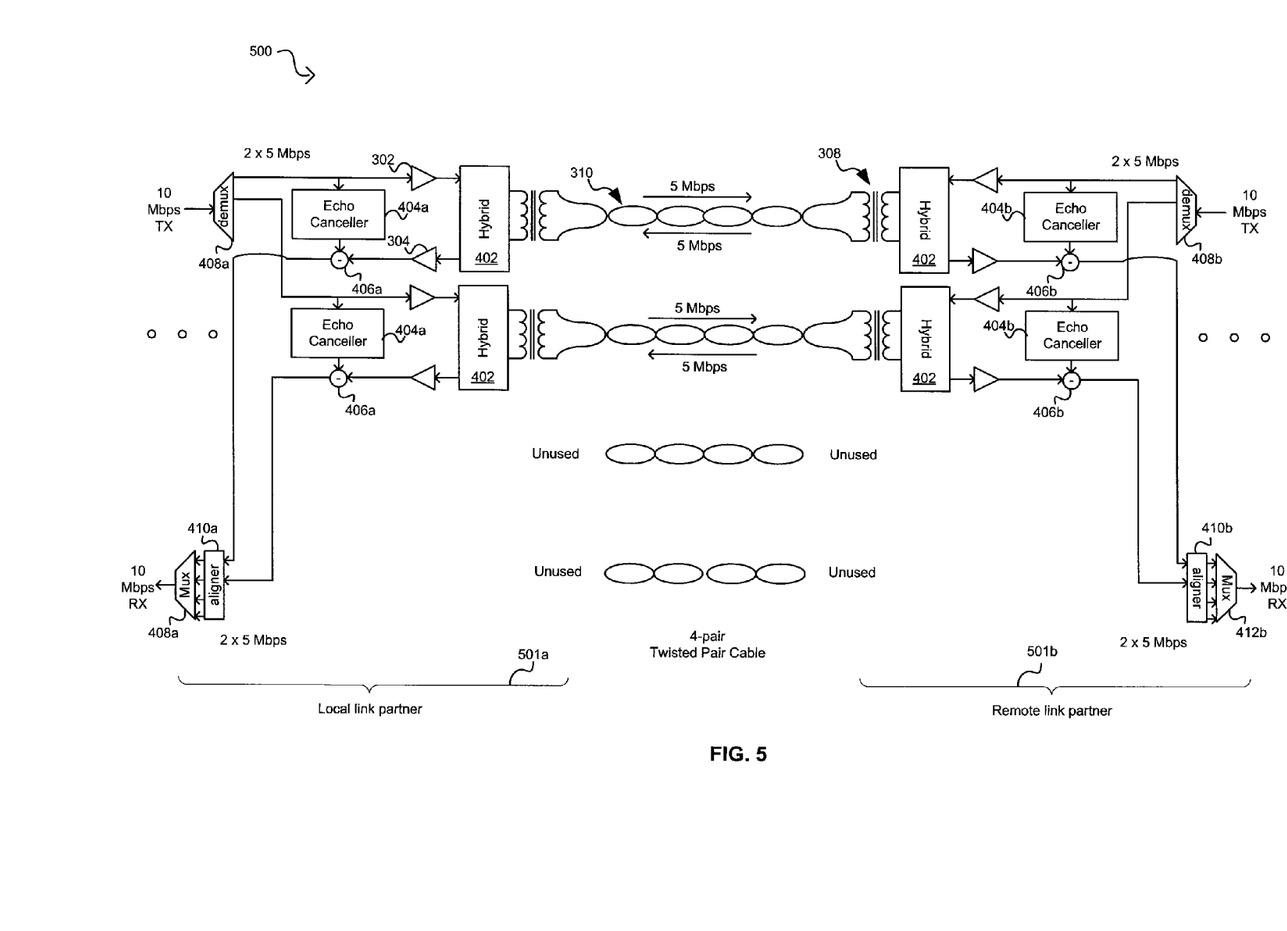
FIG. 5 is a block diagram of an exemplary 10Base-T Ethernet connection operating over two-pair twisted-pair cabling, in connection with an embodiment of the invention.

FIG. 5 is a block diagram of an exemplary 10Base-T Ethernet connection operating over two-pair twisted-pair cabling, in connection with an embodiment of the invention. Referring to FIG. 5, there is shown a multi-rate Ethernet system 500 operating as a 10Base-T connection that supports a 10 Mbps rate over two-pair twisted-pair wire. The multi-rate Ethernet system 500 may also support other modes of operation, such as 100 Mbps and/or 1000 Mbps rates over two-pair twisted-pair wire. The multi-rate Ethernet system 500 may comprise a local link partner 501a and a remote link partner 501b. The local link partner 501a and the remote link partner 501b may communicate via two twisted-pair wires 310 in full duplex operation at 5 Mbps at each wire to provide an aggregate data rate of 10 Mbps. The local link partner 501a may utilize two hybrids 402 with corresponding echo canceller 404a and a subtractor 406a. The local link partner 501a may also utilize a demux 408a, an aligner 410a, and a mux 412a for transmission and reception of signals at the communication rate of 10 Mbps. Similarly, the remote link partner 501b may utilize two hybrids 402 with corresponding echo canceller 404b and a subtractor 406b. The remote link partner 501b may also utilize a demux 408b, an aligner 410b, and a mux 412b for transmission and reception of signals at the reduced communication rate of 10 Mbps. The two remaining twisted-pair wires remain unused.

In one embodiment of the invention, when a multi-rate Ethernet system, such as the multi-rate Ethernet system 500, for example, operates as a 10Base-T connection as shown, the multi-rate Ethernet system 500 may support power reduction modes or schemes that appropriately enable or disable DACs integrated into the transmitters 302 in either the local link partner 501a and the remote link partner 501b. In this regard, the power reduction schemes may be based on operating conditions associated with the operation of the multi-rate Ethernet system 500 as a 10Base-T connection, for example.

When implementing power reduction modes or schemes based on disabling or powering down DACs in the transmitters in an Ethernet PHY, consideration may be given to the type of signaling produced by the Ethernet PHY for a particular connection rate.

Figure 6:
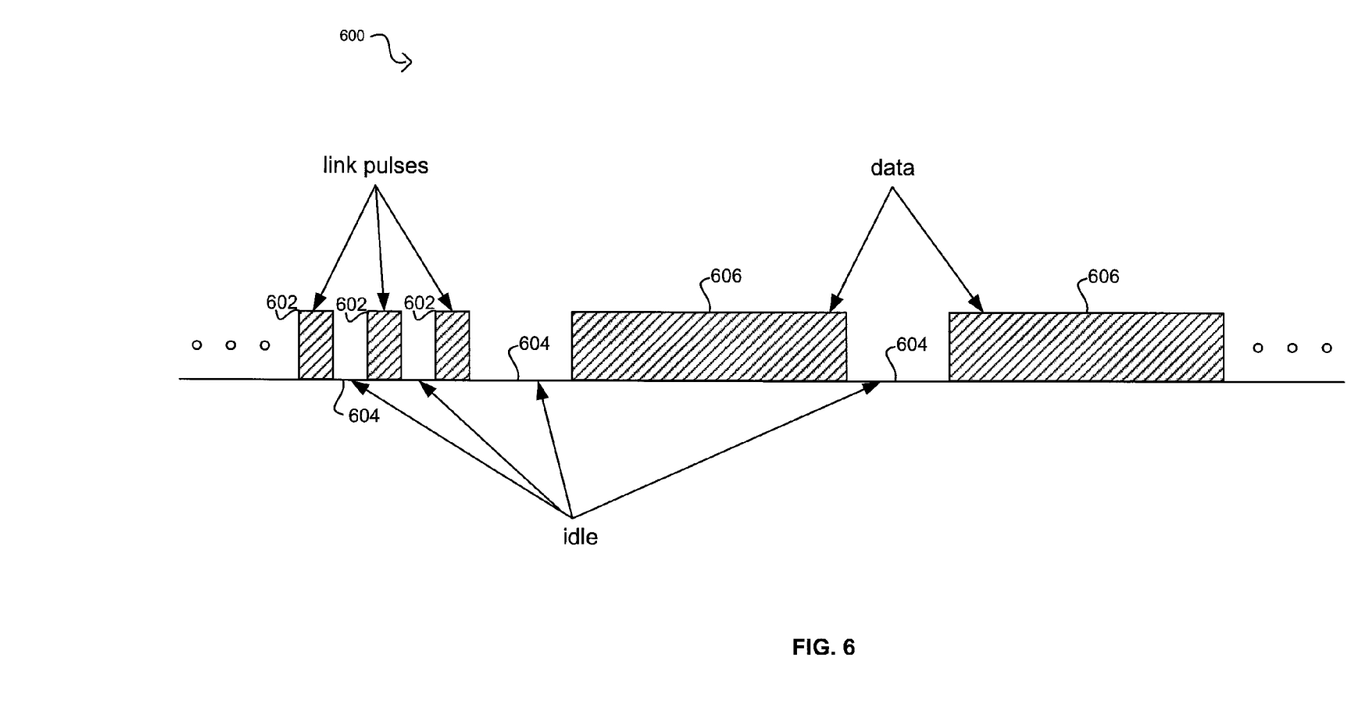
FIG. 6 is a diagram illustrating exemplary signaling between link partners during a 10Base-T Ethernet connection, in accordance with an embodiment of the invention.

FIG. 6 is a diagram illustrating exemplary signaling between link partners during a 10Base-T Ethernet connection, in accordance with an embodiment of the invention. Referring to FIG. 6, there is shown a signal 600 communicated from an Ethernet PHY over a 10Base-T connection. The signal 600 may comprise a plurality of link pulses 602, a plurality of data packets 606, and a plurality of idle portions 604. In this regard, power reduction schemes or modes that power down or disable DACs in transmitters within the Ethernet PHY may be utilized in 10Base-T connections because the signaling scheme utilizes the idle portions 604 on the transmission medium for sufficiently long periods of time. Since the idle portions 604 need not comprise information and occur between the data packets 606 and/or between link pulses 602, powering down the DACs in the transmitters may not affect the transfer of information between the Ethernet PHY and the remote link partner.

Figure 7:
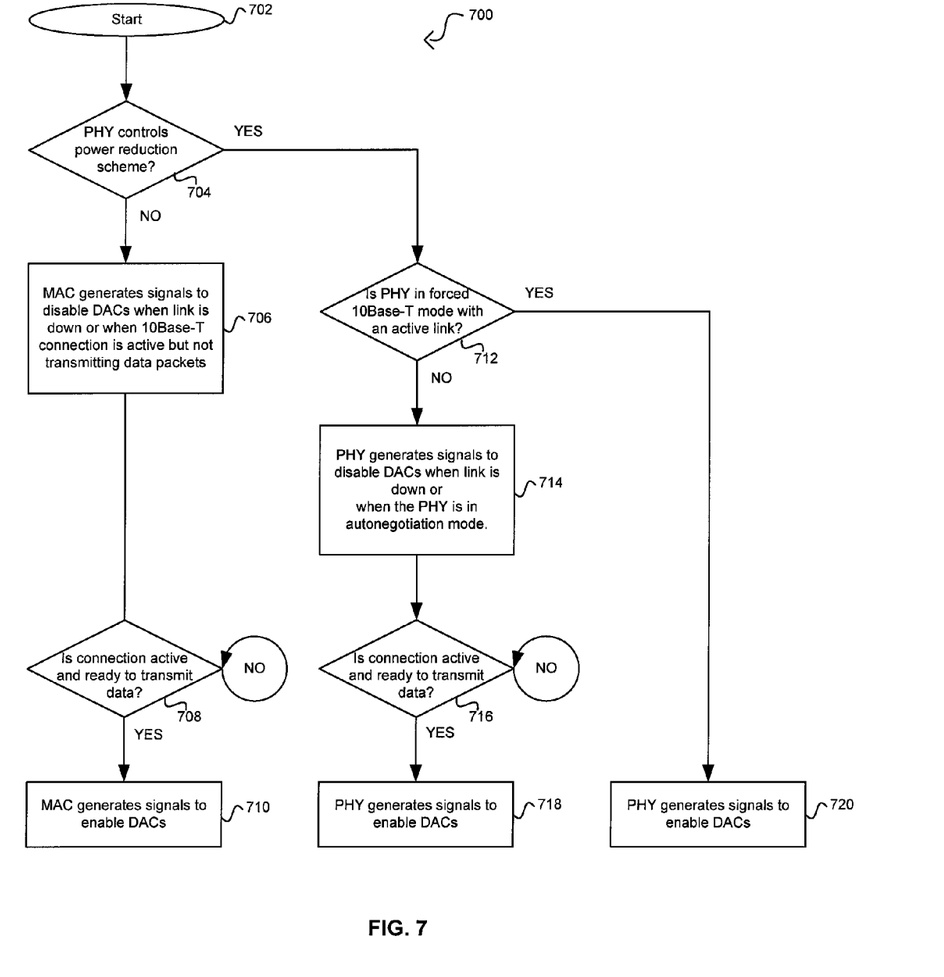
FIG. 7 is a flow diagram illustrating exemplary steps in determining when to enable or disable a power reduction scheme for 10Base-T Ethernet connections, in accordance with an embodiment of the invention.

FIG. 7 is a flow diagram illustrating exemplary steps in determining when to enable or disable a power reduction scheme for 10Base-T Ethernet connections, in accordance with an embodiment of the invention. Referring to FIG. 7, there is shown a flow diagram 700. In step 704, after start step 702, when the Ethernet PHY controls or determines whether a power reduction scheme is to be implemented that disables at least a portion of a DAC integrated into a transmitter within the Ethernet PHY, then the process may proceed to step 712. In step 712, when the Ethernet PHY is operating in a forced 10Base-T mode and the link with a remote device is active, the process may proceed to step 720. In step 720, the Ethernet PHY may generate signals that may maintain the DACs enabled while in the forced 10Base-T mode.

Returning to step 712, when the Ethernet PHY is not operating in a forced 10Base-T mode with an active link to a remote device, the process may proceed to step 714. In step 714, the Ethernet PHY may generate at least one signal that may disable at least a portion of a DAC integrated into a transmitter within the Ethernet PHY when at least one of the following occurs: the link with the remote partner may be down or not active and the Ethernet PHY may currently be operating in an autonegotiation mode. In step 716, in instances when the 10Base-T connection may be active and ready to transmit data, the process may proceed to step 718. In step 718, the Ethernet PHY may generate at least one signal that may enable a DAC integrated in a transmitter within the Ethernet PHY. In instances when the 10Base-T connection may not be active and ready to transmit data, the Ethernet PHY may continue to monitor the connection until it becomes active and is ready to transmit data.

Returning to step 704, when the MAC controls or determines whether a power reduction scheme is to be implemented that disables at least a portion of a DAC integrated into a transmitter within the Ethernet PHY, then the process may proceed to step 706. In step 706, the MAC may generate at least one signal that may disable at least a portion of a DAC integrated into a transmitter within the Ethernet PHY when at least one of the following occurs: the link with the remote partner is down or not active and the Ethernet PHY connection is active but not transmitting data packets. In step 708, in instances when the 10Base-T connection may be active and ready to transmit data, the process may proceed to step 710. In step 718, the MAC may generate at least one signal that may enable a DAC integrated into a transmitter within the Ethernet PHY. In instances when the 10Base-T connection may not be active and ready to transmit data, the MAC may continue to monitor the connection until it becomes active and is ready to transmit data.

The above described scheme may not apply to transmission modes, such as current implementations of 100Base-TX and 1000Base-T modes of operation, where encoders and scramblers may be used at all times, requiring that the DAC in the transmitter be continuously active to enable transmitting analog signals over the media. In this regard, the DAC may be placed into a reduced power mode for these transmission modes when the link becomes inactive.

In an embodiment of the invention, power reduction modes or schemes may be implemented in Ethernet PHYs that utilize DACs in their transmitters and that are integrated in battery-operated devices such as a laptop computer and/or a wireless device, for example. For example, the Ethernet PHY may be frequently not linked to a wired network when the device is running on battery power and the use of power reduction modes may be one mechanism for the device to save power in such instances.

In another aspect of the invention, Ethernet standards may require that the analog interface to a transmission medium presents a substantially stable or constant termination impedance. For example, correct operation at 10 Mbps, 100 Mbps and 1 Gbps Ethernet speeds via twisted-pair wires may require termination with a 100 ohm impedance. This may be accomplished passively with a resistor or actively with a transistor circuit, for example. However, when power to a DAC is turned off or disabled, the termination impedance may no longer be kept at the desired value or range of values. In this regard, DACs utilized in Ethernet PHYs that support power reduction modes may comprise or be integrated with, for example, a bypass-impedance that may be switched into place at the analog interface when the DAC is powered down and the active impedance on the line is removed.

Figure 8:
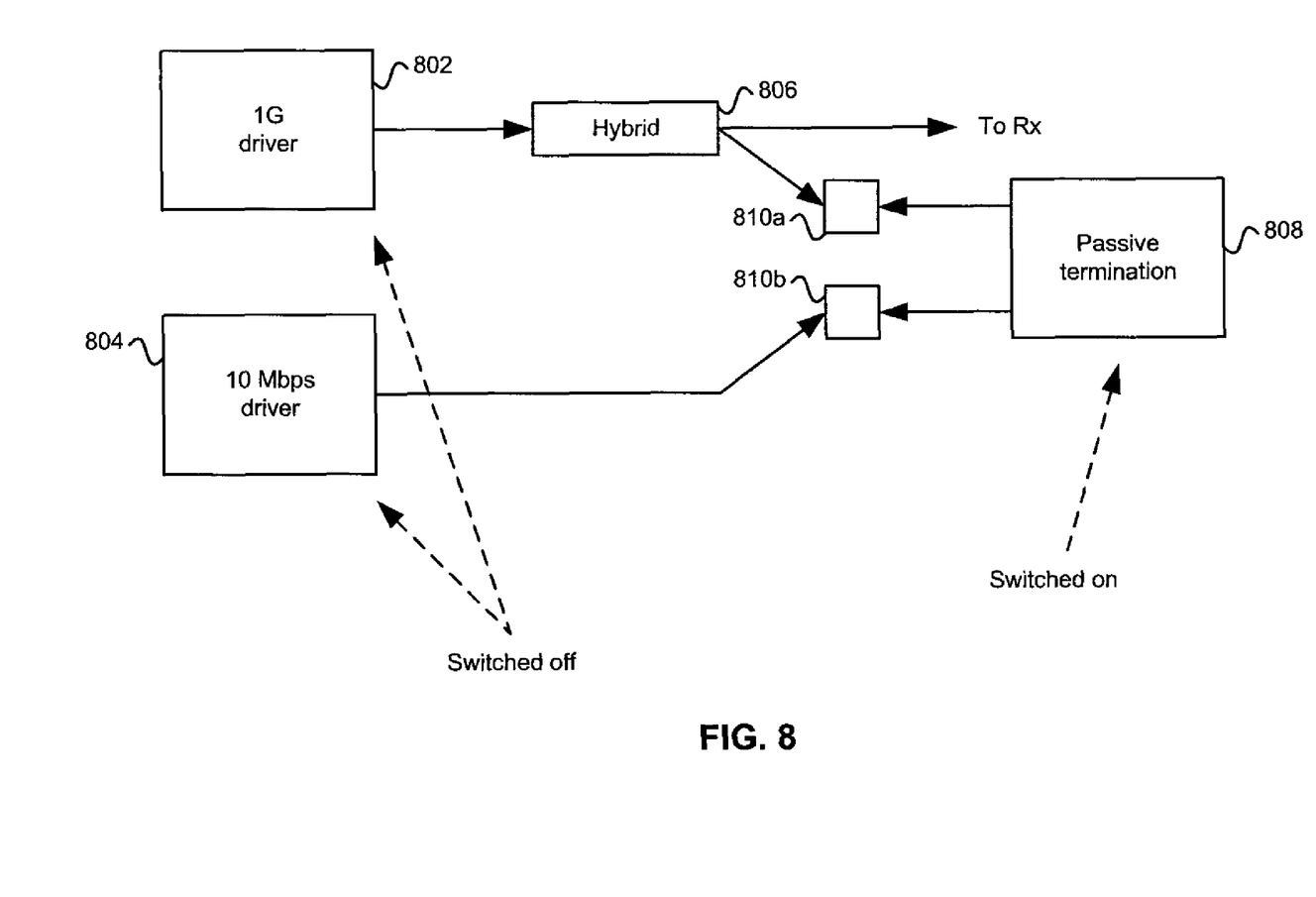
FIG. 8 is a block diagram illustrating an exemplary Ethernet transmission system with a passive termination block utilized for a power reduction scheme, in accordance with an embodiment of the invention.

FIG. 8 is a block diagram illustrating an exemplary Ethernet transmission system with a passive termination block utilized for a power reduction scheme, in accordance with an embodiment of the invention. Referring to FIG. 8, there is shown a 1 Gigabit (1G) driver 802 and 10 Mbps driver 804, a hybrid 806, pads 810*a* and 810*b*, and a passive termination 808. The 1 G driver 802 may comprise suitable logic, circuitry, and/or code that may be utilized to transmit signals at 1 Gbps in accordance with Ethernet standards. The 10 Mbps driver 804 may comprise suitable logic, circuitry, and/or code that may be utilized to transmit signals at 10 Mbps in accordance with Ethernet standards. The hybrid 806 may comprise suitable logic, circuitry, and/or code that may be utilized to couple the signals generated by the 1 G driver 802 to an analog output line, such as a twisted-pair wire, for example. The pads 810*a* and 810*b* may comprise suitable logic and/or circuitry that may enable coupling an analog output line to the passive termination 808. The passive termination 808 may comprise suitable logic, circuitry, and/or code that may enable switching on a bypass impedance in parallel with the pads 810*a* and 810*b* when DACs in the 1G driver 802 and/or in the 10 Mbps driver 804 are powered down in accordance with a power reduction scheme, for example. In this regard, switching the passive termination 808 on between the pads 810*a* and 810*b* may provide the appropriate impedance matching termination as required by the Ethernet standards.

Figure 9:
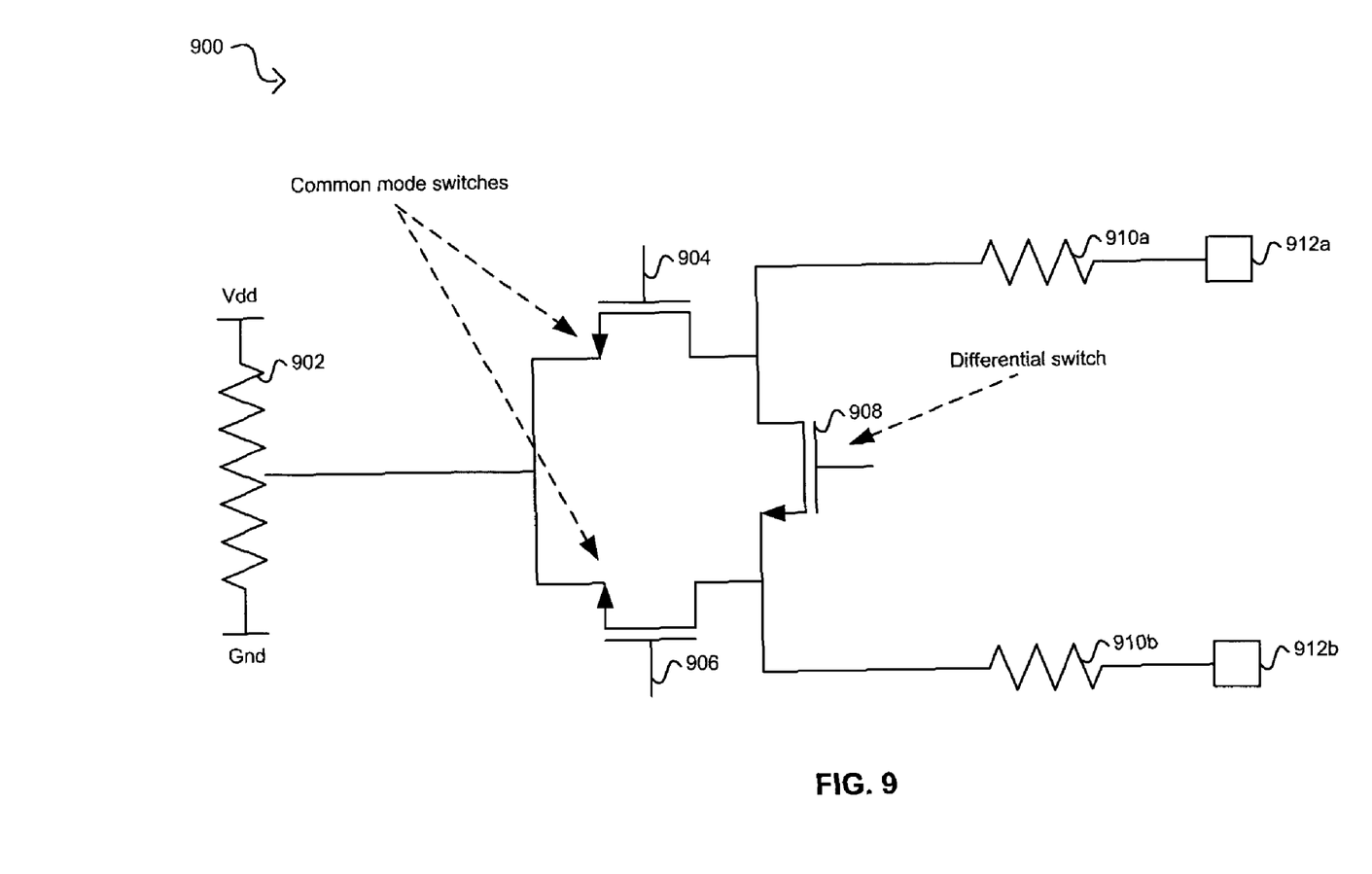
FIG. 9 is a circuit diagram illustrating an exemplary passive termination block, in accordance with an embodiment of the invention.

FIG. 9 is a circuit diagram illustrating an exemplary passive termination block, in accordance with an embodiment of the invention. Referring to FIG. 9, there is shown a passive termination 900 comprising a resistor 902, transistors 904, 906, and 908, resistors 910*a* and 910*b*, and pads 912*a* and 912*b*. The transistors 904, 906, and 908 may be NMOS FETs, for example. When the passive termination 900 is switched on as disclosed in FIG. 8, the resistors 910*a* and 910*b* may provide the parallel impedance matching termination needed for the analog output line. For example, each of the resistors 910*a* and 910*b* may be 50 ohms to provide an aggregate 100 ohm termination. This may be implemented by utilizing the transistor 908 as a switch. The resistor 902 between Vdd and Gnd may be utilized to provide a Vdd/2 bias voltage to the transistor 908 via the transistors 904 and 906 so that the transistor 908 perceives very little voltage movement and a transmission gate switch may not be necessary. In this regard, the power consumed by the passive termination 900 is mostly the power consumed by the resistor 902 between Vdd and Gnd. The passive termination 900 disclosed in FIG. 9 may be implemented utilizing a plurality of CMOS processing technologies, for example.

Figure 10:
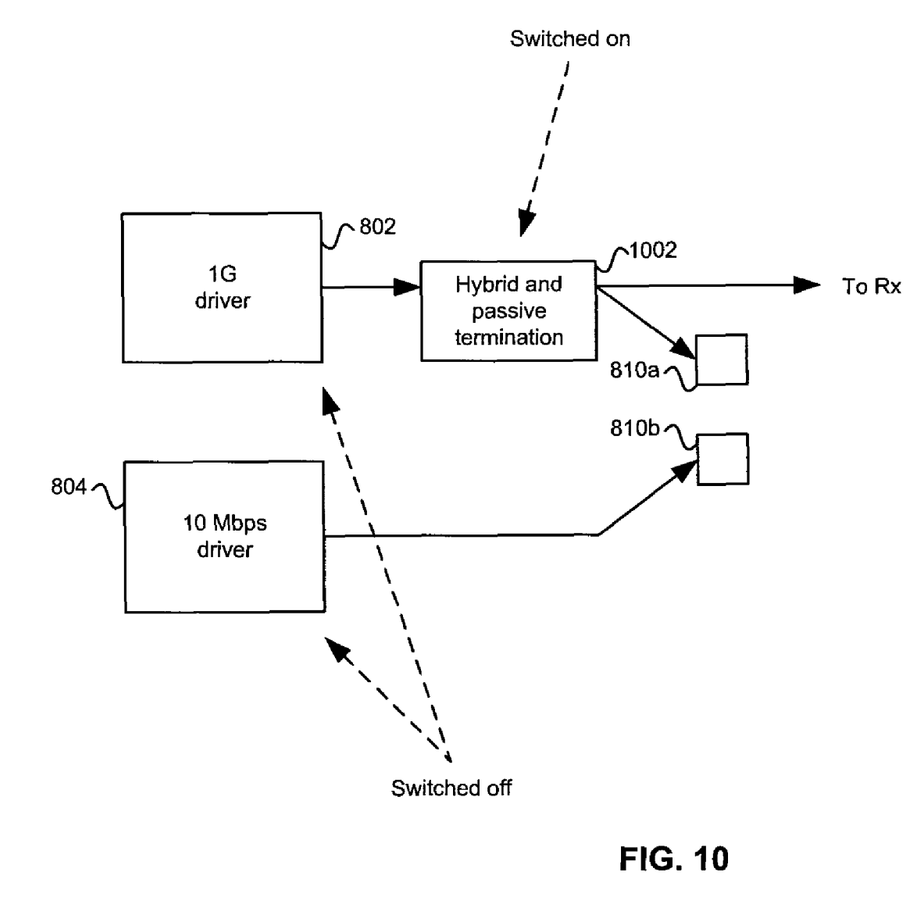
FIG. 10 is a block diagram illustrating an exemplary system with an integrated hybrid and passive termination block utilized for a power reduction scheme, in accordance with an embodiment of the invention.

FIG. 10 is a block diagram illustrating an exemplary system with an integrated hybrid and passive termination block utilized for a power reduction scheme, in accordance with an embodiment of the invention. Referring to FIG. 10, there is shown the 1 G driver 802, the 10 Mbps driver 804, the pads 810*a* and 810*b*, and a hybrid and passive termination 1002. In this regard, the hybrid and passive termination 1002 may comprise suitable logic, circuitry, and/or code that may enable switching on a bypass impedance in parallel with the pads 810*a* and 810*b* when DACs in the 1 G driver 802 and/or in the 10 Mbps driver 804 are powered down in accordance with a power reduction scheme, for example. Moreover, the hybrid and passive termination 1002 may comprise an integrated hybrid circuitry that may enable coupling the signals generated by the 1 G driver 802 to an analog output line, such as a twisted-pair wire, for example. In this regard, switching the hybrid and passive termination 1002 on between the pads 810*a* and 810*b* may provide the appropriate impedance matching termination as required by the Ethernet standards.

Figure 11:
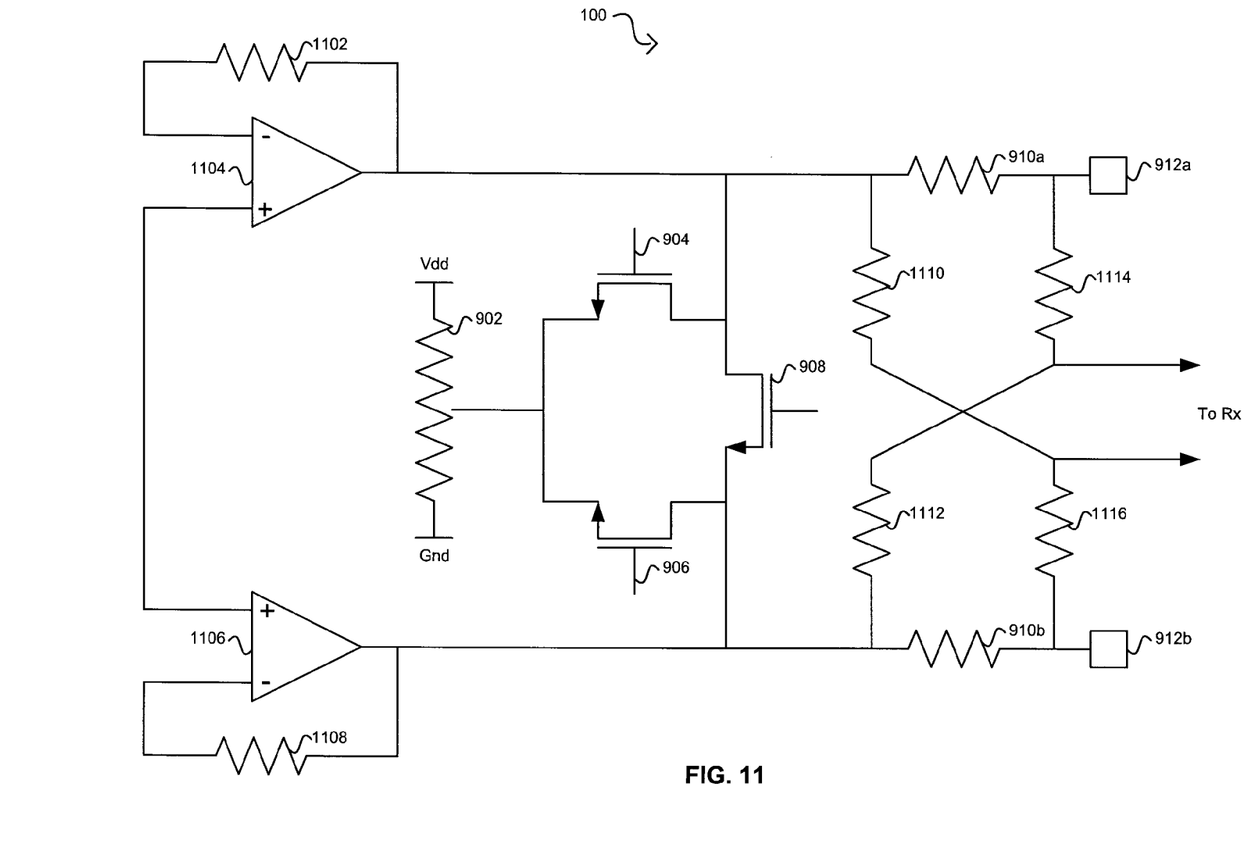
FIG. 11 is a circuit diagram illustrating an exemplary integrated hybrid and passive termination block, in accordance with an embodiment of the invention.

FIG. 11 is a circuit diagram illustrating an exemplary integrated hybrid and passive termination block, in accordance with an embodiment of the invention. Referring to FIG. 11, there is shown a hybrid and passive termination 1100 comprising a resistors 902, 910*a*, 910*b*, 1102, 1108, 1110, 1112, 1114, and 1116, transistors 904, 906, and 908, amplifiers 1104 and 1106, and pads 912*a* and 912*b*. The operation of the resistors 902, 910*a*, 910*b*, and transistors 904, 906, 908 may be to provide a passive termination impedance that matches that of the analog line output as disclosed in FIG. 9. The resistors 1102, 1108, 1110, 1112, 1114, and 1160, and the amplifiers 1104 and 1106 may enable the hybrid operation. In this regard, the resistors 910*a* and 910*b* may each be 50 ohms and may be common to the hybrid operation and to the passive impedance matching termination. Moreover, when the resistors 1110 and 1112 are 2K ohms and the resistors 1114 and 1116 are 1K ohms, for example, the transfer function from received signal from pads to Rx input may be 2/3. In the implementation disclosed in FIG. 9 these nodes may be high impedance since the amplifiers are off and the switch is located in a separate block. The transfer function from received signal from pads to Rx input in FIG. 9 is then 1/3. A gain factor of 2 may be achieved in the received transfer function when integrating the passive termination with the hybrid as disclosed in FIG. 11. The hybrid and passive termination 1100 disclosed in FIG. 11 may be implemented utilizing a plurality of CMOS processing technologies, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating signals, the method comprising:
    disabling transmission by disabling a transmit digital-to-analog converter (DAC) integrated within an Ethernet PHY during one or more of the following modes of operation: inactive connection mode, 10Base-T autonegotiation mode, and active 10Base-T connection with no data packet transmission mode; and
    determining in said Ethernet PHY when to enable said disabling of said transmit DAC.

2. The method according to claim 1, wherein said transmit DAC is one of the following: a transmit voltage mode DAC (VDAC) or a transmit current mode DAC (IDAC).

3. The method according to claim 1, comprising determining in a media access controller (MAC) when to enable said disabling of said transmit DAC.

4. The method according to claim 3, comprising generating at least one signal within said MAC to enable said disabling of said transmit DAC.

5. The method according to claim 1, comprising generating at least one signal within said Ethernet PHY to enable said disabling of said transmit DAC.

6. The method according to claim 1, comprising enabling said transmit DAC when said Ethernet PHY is operating in a forced 10Base-T mode of operation and a connection to a link partner is active.

7. The method according to claim 1, comprising enabling said transmit DAC when data packets are available for transmission via an active 10Base-T connection.

8. A non-transitory machine-readable storage having stored thereon, a computer program having at least one code section for communicating signals, the at least one code section being executable by a machine for causing the machine to perform steps comprising:
    disabling transmission by disabling a transmit digital-to-analog converter (DAC) integrated within an Ethernet PHY during one or more of the following modes of operation: inactive connection mode, 10Base-T autonegotiation mode, and active 10Base-T connection with no data packet transmission mode; and
    determining in said Ethernet PHY when to enable said disabling of said transmit DAC.

9. The non-transitory machine-readable storage according to claim 8, wherein said transmit DAC is one of the following: a transmit voltage mode DAC (VDAC) or a transmit current mode DAC (IDAC).

10. The non-transitory machine-readable storage according to claim 8, comprising code for determining in a media access controller (MAC) when to enable said disabling of said transmit DAC.

11. The non-transitory machine-readable storage according to claim 10, comprising code for generating at least one signal within said MAC device to enable said disabling of said transmit DAC.

12. The non-transitory machine-readable storage according to claim 8, comprising code for generating at least one signal within said Ethernet PHY to enable said disabling of said transmit DAC.

13. The non-transitory machine-readable storage according to claim 8, comprising code for enabling transmission via said transmit DAC when said Ethernet PHY is operating in a forced 10Base-T mode of operation and a connection to a link partner is active.

14. The non-transitory machine-readable storage according to claim 8, comprising code for enabling transmission via said transmit DAC when data packets are available for transmission via an active 10Base-T connection.

15. A system for communicating signals, the system comprising:
    an Ethernet PHY in a link partner that disables transmission by disabling a transmit digital-to-analog converter (DAC) integrated within said Ethernet PHY during one or more of the following modes of operation: inactive connection mode, 10Base-T autonegotiation mode, and active 10Base-T connection with no data packet transmission mode, wherein said Ethernet PHY enable determining when to enable said disabling of said transmit DAC.

16. The system according to claim 15, wherein said transmit DAC is one of the following: a transmit voltage mode DAC (VDAC) or a transmit current mode DAC (IDAC).

17. The system according to claim 15, wherein said link partner comprises a media access controller (MAC) that enables determining when to enable said disabling of said transmit VDAC.

18. The system according to claim 17, wherein said MAC device enables generation of at least one signal to enable said disabling of said transmit VDAC.

19. The system according to claim 15, wherein said Ethernet PHY enables generation of at least one signal to enable said disabling of said transmit VDAC.

20. The system according to claim 15, wherein said Ethernet PHY enables said transmit VDAC when said Ethernet PHY is operating in a forced 10Base-T mode of operation and a connection to a link partner is active.

21. The system according to claim 15, wherein said Ethernet PHY enables said transmit VDAC when data packets are available for transmission via an active 10Base-T connection.

22. A method for communicating signals, the method comprising:
    switching on an impedance matching termination coupled to an analog line after disabling transmission disabling a transmit digital-to-analog converter (DAC) integrated within an Ethernet PHY during one or more of the following modes of operation: inactive connection mode, 10Base-T autonegotiation mode, and active 10Base-T connection with no data packet transmission mode.

23. The method according to claim 22, wherein said impedance matching termination is one of the following: an active impedance termination or a passive impedance termination.

24. A system for communicating signals, the system comprising:
an Ethernet PHY in a link partner that enables switching on an impedance matching termination coupled to an analog line after disabling transmission by disabling a transmit digital-to-analog converter (DAC) integrated within said Ethernet PHY during one or more of the following modes of operation: inactive connection mode, 10Base-T autonegotiation mode, and active 10Base-T connection with no data packet transmission mode.

25. The system according to claim 24, wherein said impedance matching termination is one of the following: an active impedance termination or a passive impedance termination.

26. The system according to claim 24, wherein said impedance matching termination is integrated with hybrid circuitry.

* * * * *